United States Patent Office 3,125,780
Patented Mar. 24, 1964

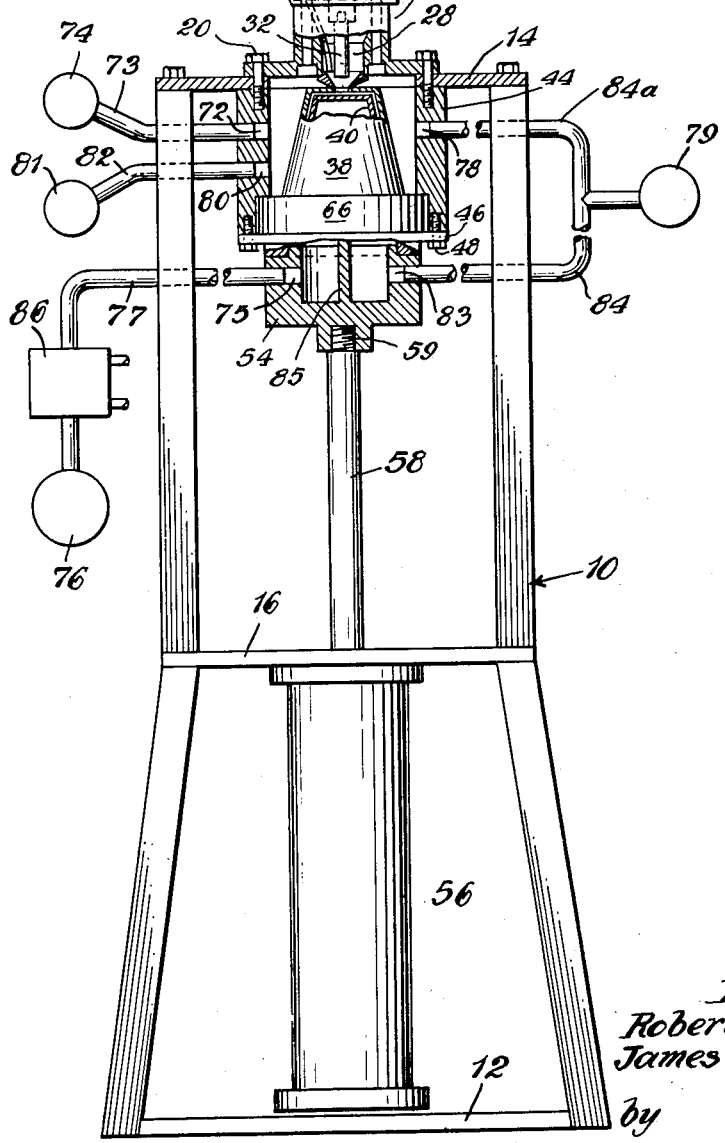

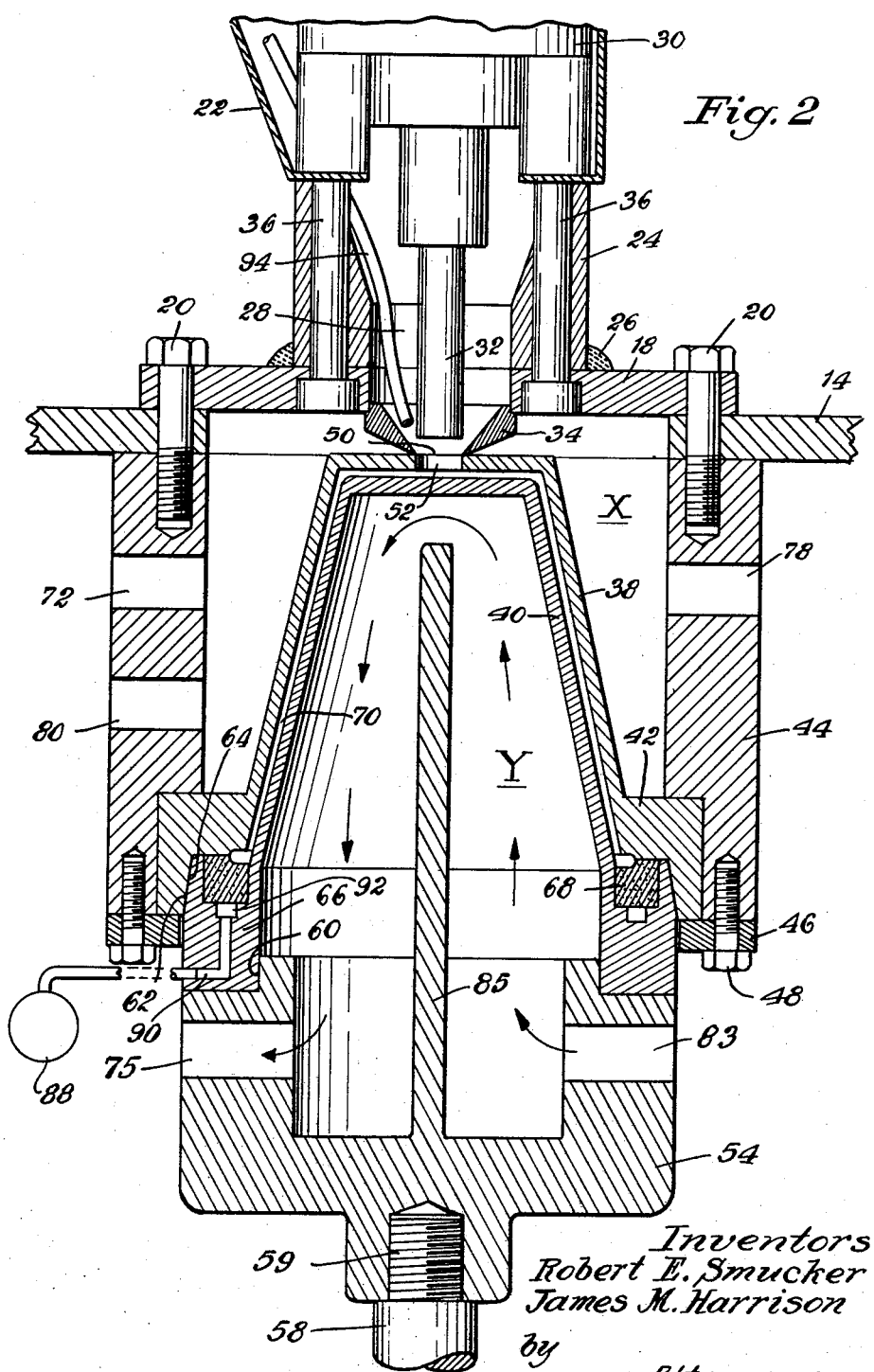

3,125,780
APPARATUS AND METHOD FOR MAKING
PLASTIC CONTAINERS
James M. Harrison, Fort Worth, Tex., and Robert E. Smucker, Miami, Fla., assignors to Crown Machine and Tool Company, Inc., Fort Worth, Tex., a corporation of Texas
Original application Oct. 30, 1956, Ser. No. 619,259. Divided and this application Apr. 19, 1962, Ser. No. 191,662
4 Claims. (Cl. 18—5)

This is a division of Serial No. 619,259, filed October 30, 1956.

This invention is in the field of plastic molding methods and equipment and is a new and improved method and apparatus for forming plastic articles. The invention is specifically concerned with making what is referred to as drinking cups, either of the vending type adapted to be used in coin controlled drink vending machines, or of the non-vending type adapted to be packaged and sold in stores or for packaging ice cream or containers for other foods. The container may be a one use disposable item although, quite naturally, it may be kept and reused if desired.

A primary object of the invention is an apparatus for molding plastic cups, referred to as foamed cups, that reduces the number of defective cups.

Another object is a molding apparatus that is inexpensive but reliable in operation.

Another object is an apparatus for molding a thin wall cuplike container from a plastic material in beaded or finely divided form which has been treated or processed to contain, in its natural state, a blowing or expanding agent, which, when exposed to heat on the order of 240° F. causes the natural bead to expand to many times its original size, producing a container material which may have a density on the order of 2 pounds per cubic foot.

Other objects will appear from time to time in the ensuing specification and drawings in which:

FIGURE 1 is a side view, partly in section of our molding apparatus; and

FIGURE 2 is a vertical section, on an enlarged scale, of a part of the mechanism in FIGURE 1.

We start with what is referred to as raw beads. These may be any suitable plastic charged with a foaming agent or gas. The beads are plastic and may be polystyrene, or the like, and the foaming or charging agent may be methylchloride, butane, pentane, heptane or the like. A wide number of materials may be used. For example, polystyrene foam now being sold by the Plastics Division of Monsanto Chemical Company is polystyrene crystals or beads charged with a foaming agent or gas of methylchloride or butane and is acceptable, but others may be used. The size of the individual raw bead is not closely controlled by the manufacturer and the raw beads have been known to run from 15 to 30 thousandths in diameter down to diameters that defy measurement. In all cases, the raw beads are finely divided, clear and crystalline, but vary somewhat in size.

To make a thin wall cup shaped article from these raw beads is difficult. The beads expand when heated and the amount or degree of expansion is directly proportional to the temperature. The foaming temperature, which affects the maximum amount of expansion, may be from 230 degrees to 240 degrees F. in the case of polystyrene foam. When the beads are subjected to this foaming temperature, they swell and expand to many times their original size.

The volume of raw beads required to produce an article such as a thin wall cup will fill only a minor portion of the molding cavity, for example, three to four percent, if that much. If the raw beads are introduced into the cavity and subjected to the foaming temperature, they will initially fill only a small portion of the cavity, and instead of rising and spreading uniformly throughout the thin wall cavity when foamed, the beads will remain in their localized area and produce a quite useless, highly dense, small segment of the desired article.

To overcome this, we use prefoaming. This involves heating the raw beads to an intermediate temperature substantially below the foaming temperature. The particular temperature may be varied depending upon the type of material and foaming agent involved, the desired article and its characteristics, such as, the desired density and weight, and so on. The raw beads are heated to what we term an intermediate temperature, producing prefoamed beads. Because the raw beads from the chemical house vary in size, the resulting prefoamed beads vary in size because they have expanded in direct proportion to their original size. Some of the prefoamed beads will be quite small while others will be quite large.

Before the prefoamed beads can be used in a molding apparatus, they must all be brought down to a certain maximum size. We may do this in a number of ways. One efficient way is to run the prefoamed beads through sizing rollers which will compress the larger beads down to the maximum permissible size while the smaller beads will merely pass through. A reciprocating press might be used, but we find rollers preferable to supply a steady flow to the molding machine.

In FIGURES 1 and 2, we have shown a suitable molding mechanism which may vary extensively in detail from the precise showing and still carry out the basic operation. A suitable frame is indicated generally at 10 extending upwardly from a base 12 to a top platform 14 which is the main support. The frame may have an intermediate platform 16 if desired.

The upper platform 14 removably carries a plate 18 by any suitable securing means, such as, the bolts 20 or the like. This plate supports a suitable hopper or source of supply 22. A body member 24, welded or otherwise secured at 26 to the top plate, supports the hopper in any suitable manner and is provided with a central passage 28 opening in the hopper so that the prefoamed beads in the hopper will flow downwardly through the central passage 28 to the molding mechanism. We mount a suitable air cylinder 30 or the like in the hopper which may have a suitable cylinder and piston operating a plunger or valve 32 which extends down through the central passage 28 to a gate or orifice 34. The air cylinder may be held by tie rods 36 or the like which extend through the plate 18 connecting the air cylinder firmly to the frame.

We dispose molding parts below the hopper which may include a cavity element 38 and a core element 40. Considering the cavity first, it will be noted that this element may be in the form of an inverted cup with an outstanding circular flange 42 at the bottom secured to a side frame or housing 44 by a plate 46 held by a suitable number of screws 48 or otherwise. The frame or housing 44 is held at its upper end by the screws or bolts 20 which hold the plate 18 on the top platform 14.

The gate or nozzle 34 from the feed-in passage 28 may taper down conically like a funnel to a lower port or gate edge 50. This edge rests firmly against a suitable inlet opening 52 in the cavity element. The air cylinder in the hopper operates the plunger 32 to open and close the gate, and we prefer that the plunger extend into the port 52 and, in effect, form a continuation of the inner wall in its lower or position of maximum excursion.

The housing 44 defines a chamber, indicated generally at X, around the cavity element. Suitable passages and connections may be provided as set forth in detail hereinafter.

The core element 40 is carried by a head 54 which is raised and lowered by an air cylinder 56 suitably mounted in the frame. The piston rod 58 from the cylinder is screwed into or otherwise suitably connected to the head as at 59, the details being unimportant. The inverted core element has a hollow interior and is suitably seated and held in any suitable manner as at 60 on the head. The outer edge of the core element is conically tapered at 62 to mesh with a correspondingly tapered seat or guide 64 in the cavity element to pilot the core to its seat. A peripheral edge or flange 66 of the core element may be suitably grooved to receive a stripper ring 68, which may be continuous or otherwise and may be actuated in any suitable manner.

The core and cavity elements are shown closed in FIGURE 2 and the molding cavity 70, in the form of a thin walled container, preferably a drink cup, is defined between the two parts. The plunger 32 controlling the gate allows prefoamed beads to flow down from the hopper 22 in timed relation to the operation of the other parts.

The hollow interior of the core element defines a chamber, indicated generally at Y, for purposes to be set forth hereinbelow.

The side wall 44 of the housing surrounding the cavity element is provided with a suitable port 72 and a connection 73 so that hot air or steam may flow into the chamber X from a suitable hot air or steam source indicated diagrammatically at 74. A suitable port 75 for the chamber Y in the core element is connected to a source of vacuum indicated generally at 76 by a connection 77. The housing 44 may have a cold air inlet 78 connected to a suitable source 79 by a connection 84a. A cold air outlet 80 on opposite sides of the cavity element may be connected to a suction pump or the like 81 by a suitable connection 82. A cold air inlet 83 may be provided in the base 54, connected to the same source by a suitable connection 84, so that cold air flows the full length of the core element over an intermediate wall or baffle 85 to the vacuum port or outlet 75.

The use, operation and function of the invention are as follows:

We provide a core element insertable into a cavity element to define between them a relatively thin walled container. We mention, for example, 60 thousandths of an inch as the wall thickness, although this may vary. The cavity element is surrounded by a chamber and the inside of the core element is formed into a chamber so that both sides of the part being molded may be treated. We believe that the invention can be best understood from a simple description of the sequence of operation in a molding cycle. Prefoamed beads are first supplied to the hopper 22, either continuously by a belt or conveyor or on a batch basis.

The core element is in a lower position from a previous cycle and by any suitable means, manual or otherwise, air is supplied to the cylinder 56 so that the core element is raised and inserted into the cavity element closing the mold. When the mold is fully closed, a suitable limit switch or the like, not shown, may actuate the feed cylinder 30 to raise the ram 32 allowing prefoamed beads to flow into the cavity.

The core element and cavity element may be made of porous metal so that hot and cold air may easily flow through the sides of the cavity. As soon as the plunger 32 is raised, a source of vacuum may be communicated to the chamber Y inside the core element, for example, through the connection 77. This draws the prefoamed beads into the mold cavity. After a predetermined time, the air cylinder 30 may be actuated by a timer or otherwise to lower the valve plunger 32. When the gate is fully closed, a suitable limit switch or otherwise may be tripped to provide hot air or steam to the chamber X, for example, through the connection 72. Both the core and cavity elements 38 and 40 may be of porous metal and the vacuum is continued in the chamber Y inside the core element. The hot air or steam will move directly through the cavity and core elements and through the chamber containing the prefoamed beads. The temperature of the air should be on the order of the foaming temperature of the beads. The heat expands the prefoamed beads until they unite forming a cup shaped article in the mold chamber. The surface of the plastic in engagement with the sides of the mold will fuse or glaze into a smooth impervious glaze or shell, both on the inside and outside. The body of the plastic between the two impervious glazes or shells will remain cellular providing an effective heat transfer barrier.

As the hot air flows through the cavity expanding and solidifying the prefoamed beads, the flow of air will be progressively blocked. If any weak points or voids occur in the plastic, the hot air flow will concentrate at that point. This steps up the foaming of the beads, resulting in total solidification throughout the cavity. Due to the air flow and its ability to concentrate at the weak points, the arrangement is self-correcting.

After a predetermined time, the hot air or steam may be shut off and the finished article and mold parts are cooled. This is done by admitting cold air or water to the upper chamber X as through the connection 78 and withdrawing it on the opposite side as at the connection 80. The plastic cup in the mold is solid and air cannot flow through the porous metal. We also supply cold air to the chamber Y inside the core element. For example, air may be supplied through the connection 83 on one side and exhausted through the connection 75 on the other, the wall 85 or upstanding barrier in the chamber forcing the cool air to pass along the full length of the core surface. In both cases the cold air is supplied for a predetermined period and is timed out. After sufficient cooling, the ram cylinder 56 may be actuated by a timing device to lower the core element. At a suitable point, a limit switch may be actuated to supply relatively high pressure air to the core chamber Y. This may expand the molded cup on the core slightly and strip it off. This is an alternative to the use of a mechanical stripper such as the ring 68 and we have only shown this diagrammatically without any stripper or pusher rods because the arrangement is optional.

If a vacuum pump is connected to the port 75 to pull the hot air or steam through the core and the mold, and also to pull cold air through the core chamber Y, we suggest that heat exchanger or intercooler be inserted in the suction line, such as at 86, to prevent hot air from damaging the pump.

While we have shown the use of hot air or steam as the heating means, it should be understood that dielectric heating may be used. In this case the cavity and core 38 and 40 would not be of porous material and a suitable dielectric assembly would be disposed around the cavity element to instantaneously heat the prefoamed beads in the mold cavity. This has the advantage that heat is applied only to the prefoamed beads and not directly to the mold parts, although they would heat up due to contact with the beads.

If dielectric heating is used and the core and cavity are not porous, the stripper ring 68 would be used to strip the finished article off of the core, rather than supplying pressure air to the inside of the core. In this case, the stripper ring could be made of porous metal and, by suitable connections, vacuum could be applied through the stripper ring to the mold cavity and to the inlet chamber 28 and gate 50 to draw the prefoamed beads down from the hopper during loading.

It should be understood that in either case, during loading, prefoamed beads are supplied until the mold cavity is substantially filled.

Some of the advantages of our method are as follows: high pressures are not required; the temperatures involved are low, and the cavity may be easily loaded by vacuum.

The prefoamed beads fill the entire cavity and the resultant cup has a uniform density. Chilling is easy. Heating is equally simple. The machine itself is quite simple, requires no expensive parts or close tolerances, and the device is reliable.

One of the important aspects of this invention is the method and means used to load the molding cavity. The prefoamed beads in the hopper are quite light and will resist or otherwise circumvent any sort of positive displacement feeding means. We apply a vacuum to the cavity so that the lightweight prefoamed beads will be drawn. This has the advantage that the beads will be drawn evenly and uniformly down to the lower edge or bottom rim of the cup-shaped article and the cavity will be completely filled. We also find it of advantage to size the beads by compressing them so that they will all be brought down to a predetermined maximum size. This size of course is governed by the wall thickness of the cavity and as a broad general rule our sizing brings the beads down to a thickness substantially less than the wall thickness of the cavity. In the example given where the wall parts are not porous, a vacuum source 88 can be applied to the stripper ring 68 through a passage 90 and channel 92 so that the vacuum would be communicated the full length of the cup-shaped molding cavity up through the wall to what is normally the bottom of the cup, but in this case is the top since the cup is inverted. The stripper ring might be spring loaded or it might by positively actuated in any suitable manner.

In connection with applying a positive pressure to the inlet opening 52 to blow the beads into the mold, a simple air pipe 94 may be disposed in the hopper or otherwise with its outlet end 90 directed at the inlet opening 52.

While we have shown and described the preferred form and suggested several variations of our invention, others will be obvious. Our showing is intended to be illustrative or diagrammatic only. For example, the mold parts might be provided with fins of any suitable type to step up the heat transfer rate.

We claim:

1. In a molding mechanism for forming plastic articles, such as drinking cups and the like, from foamable plastic material, a base, a frame supported on the base, mold parts thereon defining a cup-shaped molding cavity including a cavity element and a core element, a source of supply on the frame adapted to supply foamable plastic material to the cavity, a supply passage between the source of supply and the cavity communicating with the cavity generally in the center of the small end of the cup as defined by the cavity, a valve for controlling the supply passage including a movable plunger generally aligned with the axis of the cavity and having a diameter less than the diameter of the bottom of the cup, the plunger being movable between a withdrawn position to allow foamable material to flow through the supply passage into the cavity and an extended position in which the plunger closes the supply passage and the face of the plunger completes the bottom of the cup as defined by the cavity, means for creating an air pressure differential through the cavity to convey the beads from the supply passage to the top edge of the cup as defined by the cavity, including means for applying a positive air pressure to the supply passage for blowing the prefoamed beads into the molding cavity, and means for heating the cavity to foam and unite the foamable material into a finished article.

2. The structure of claim 1 further characterized in that the cavity and core elements that make up the molding cavity are porous so that the air stream caused by the means for creating an air pressure differential may flow through the walls of the cavity.

3. The structure of claim 1 further characterized in that the core and cavity that make up the molding cavity are impervious so that the air stream caused by the means for creating an air pressure differential flows through the cavity between and generally parallel to the opposed faces of the elements.

4. In a molding mechanism for forming plastic articles, such as drinking cups and the like, from foamable plastic material, a base, a frame supported on the base, mold parts thereon defining a cup-shaped molding cavity, the mold parts being of impervious material and including a cavity element and a core element, a source of supply on the frame adapted to supply foamable plastic material to the cavity and communicating with the small end of the cup-shaped cavity, a stripper ring at the large end of the cup-shaped cavity of porous material, and means for applying an air pressure differential through the cavity to load the cavity with foamable material, the air being exhausted through the pores of the stripper ring so that the foamable material flows from the small end of the cavity toward the stripper ring at the large end.

References Cited in the file of this patent

UNITED STATES PATENTS

| | | |
|---|---|---|
| 2,066,988 | Lee | Jan. 5, 1937 |
| 2,713,697 | Willcox | July 26, 1955 |
| 2,773,284 | Kelley | Dec. 11, 1956 |
| 2,898,632 | Irwin et al. | Aug. 11, 1959 |
| 2,907,072 | Jodell | Oct. 6, 1959 |
| 3,013,304 | Ritchie et al. | Dec. 19, 1961 |
| 3,081,488 | Casavina et al. | Mar. 19, 1963 |

OTHER REFERENCES

Koppers booklet, "dylite-expandable-polystyrene," 1954, pp. 14–20. (Copy in 18-48S.)

UNITED STATES PATENT OFFICE
CERTIFICATE OF CORRECTION

Patent No. 3,125,780                    March 24, 1964

James M. Harrison et al.

It is hereby certified that error appears in the above numbered patent requiring correction and that the said Letters Patent should read as corrected below.

Column 5, after line 29, insert the following paragraph:

> It is important that the prefoamed beads be sized, preferably by rolling, so that they will all be brought down to the maximum size allowed by the wall thickness of the cavity. While we have stated that loading the cavity is done by vacuum, it might be more accurate to say that loading is done by the creation of a pressure differential. For example, we might apply a positive pressure to the inlet or gate opening and blow the prefoamed beads into the mold. The stripper ring might be spring loaded or it might be positively actuated in any suitable manner.

Signed and sealed this 10th day of November 1964.

(SEAL)
Attest:

ERNEST W. SWIDER                    EDWARD J. BRENNER
Attesting Officer                    Commissioner of Patents